Jan. 11, 1949.                    J. B. JOHNSON                    2,458,601
                    METHOD OF AND APPARATUS FOR MEASURING PRESSURE
Filed March 24, 1944                                    7 Sheets-Sheet 1
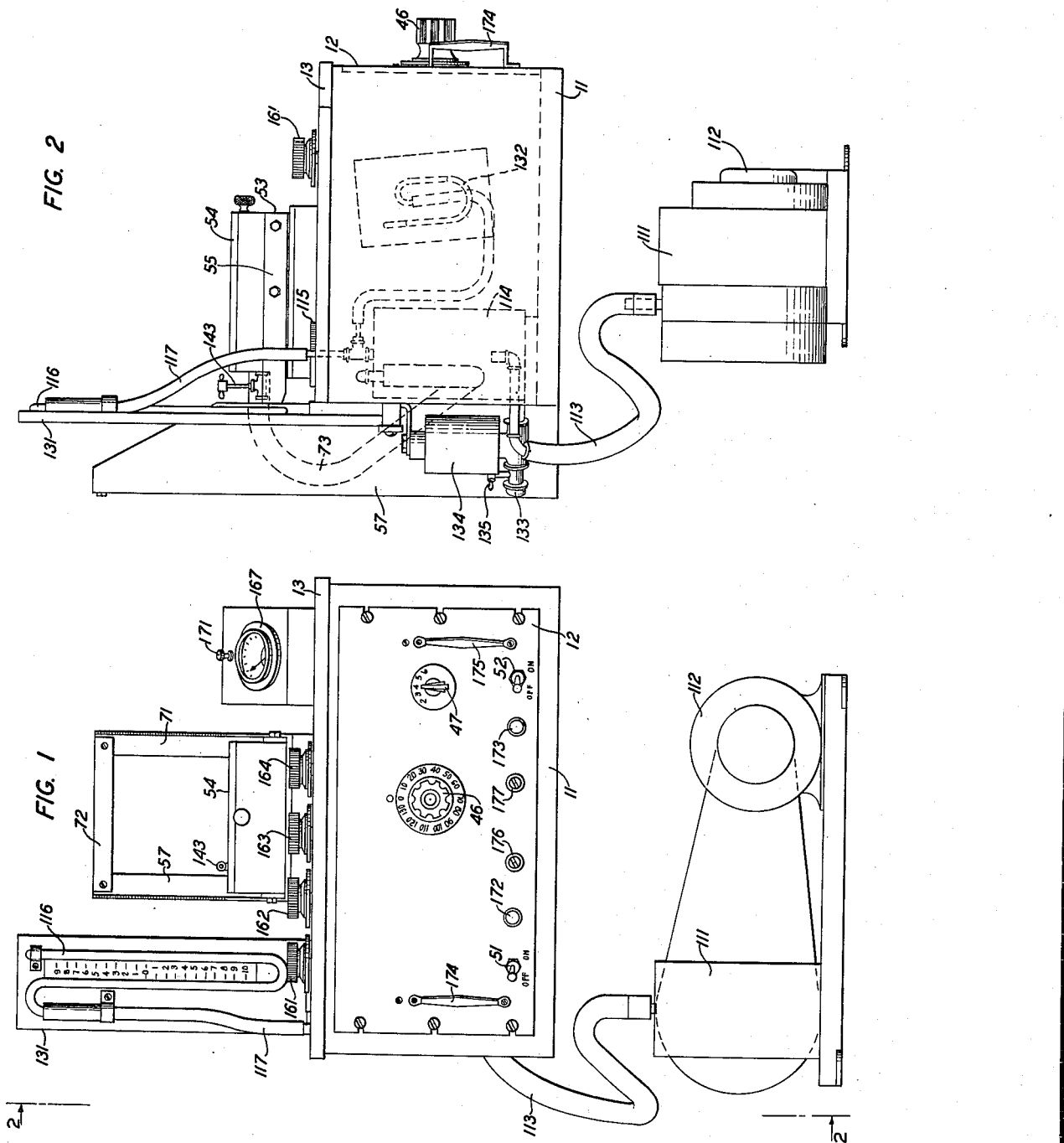
INVENTOR
J. B. JOHNSON
BY
E. V. Griggs
ATTORNEY Jan. 11, 1949.  J. B. JOHNSON  2,458,601
METHOD OF AND APPARATUS FOR MEASURING PRESSURE
Filed March 24, 1944  7 Sheets-Sheet 2

INVENTOR
J. B. JOHNSON
BY
E. V. Gregg
ATTORNEY

Jan. 11, 1949.   J. B. JOHNSON   2,458,601
METHOD OF AND APPARATUS FOR MEASURING PRESSURE
Filed March 24, 1944   7 Sheets-Sheet 3

INVENTOR
J. B. JOHNSON
BY
ATTORNEY

Jan. 11, 1949.   J. B. JOHNSON   2,458,601
METHOD OF AND APPARATUS FOR MEASURING PRESSURE
Filed March 24, 1944   7 Sheets-Sheet 4

INVENTOR
J.B. JOHNSON
BY
E.V. Griggs
ATTORNEY

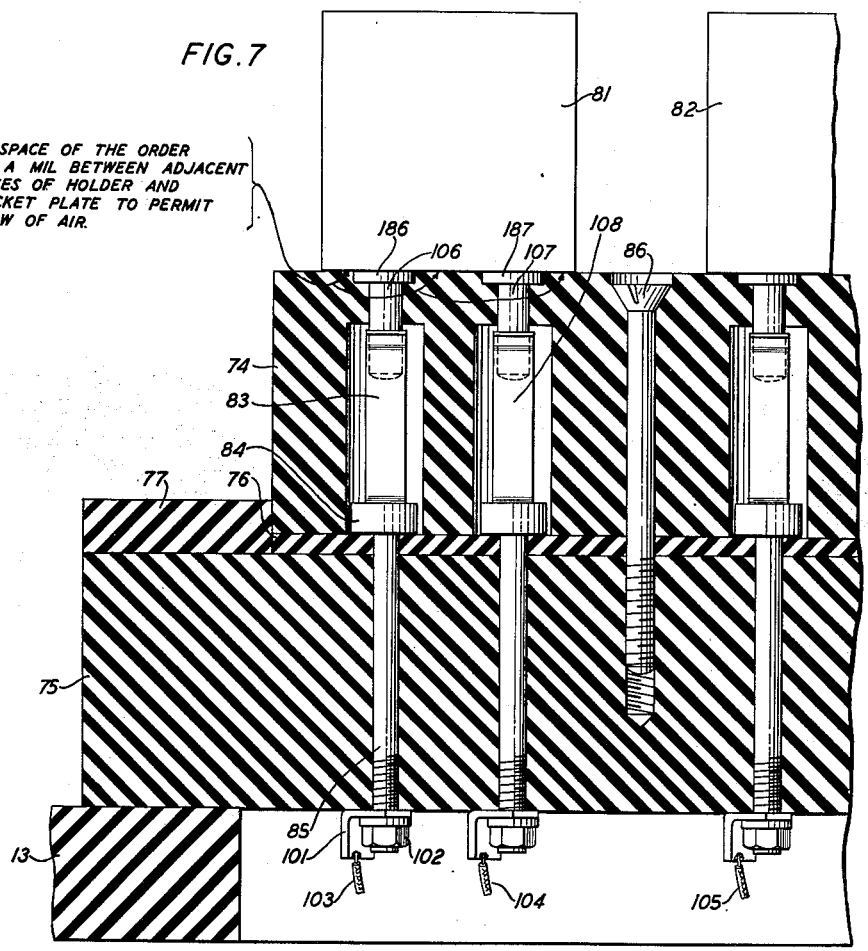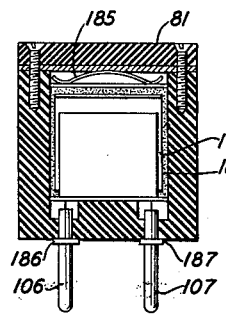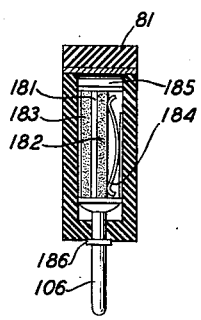

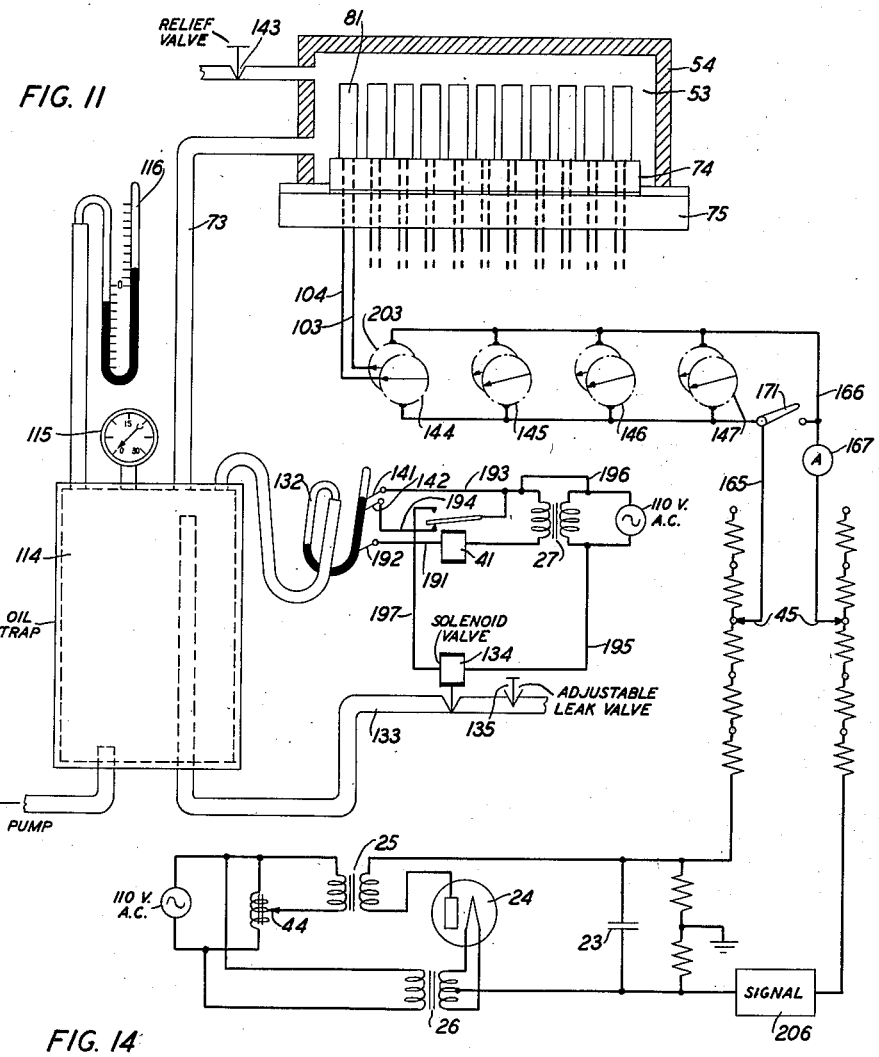

Jan. 11, 1949.   J. B. JOHNSON   2,458,601
METHOD OF AND APPARATUS FOR MEASURING PRESSURE
Filed March 24, 1944   7 Sheets-Sheet 7

INVENTOR
J.B. JOHNSON
BY
E. V. Griggs
ATTORNEY

Patented Jan. 11, 1949

2,458,601

UNITED STATES PATENT OFFICE 2,458,601

METHOD OF AND APPARATUS FOR MEASURING PRESSURE

John B. Johnson, Maplewood, N. J., assignor to Bell Telephone Laboratories, Incorporated, New York, N. Y., a corporation of New York Application March 24, 1944, Serial No. 528,011

7 Claims. (Cl. 175—183)

This invention relates to a method of and apparatus for measuring pressure and more particularly to a method of and apparatus for measuring pressure within hermetically sealed devices.

An object of the invention is to facilitate the measurement of pressures within closed containers.

A more specific object of the invention is to facilitate the measurement of pressures which are lower than atmospheric pressure but not lower than a pressure of approximately one-half inch of mercury.

Another specific object of the invention is to facilitate testing hermetically sealed devices for leakage.

Still another specific object of the invention is to prevent undesired sparking between two opposed electrical conductors which are positioned in an area of relatively low pressure.

Quartz piezoelectric plates, when designed for use in apparatus which is likely to be subjected to rapidly changing atmospheric conditions such, for example, as radio apparatus for aircraft, are commonly hermetically sealed, at atmospheric pressure, within a suitable container, which may comprise a box and cover of suitable insulating material, such as Bakelite, together with a gasket and screws for clamping the cover in closed and sealed position after the plate has been mounted in the holder. Suitable terminal pins may be mounted on the outside of the box to permit making electrical connection to the electrodes of the crystal plates mounted within the holder. (In order to facilitate the use of piezoelectric crystal plates in electrical circuits, it is usual to provide electrodes on one or more of the surfaces of the plate to which the external circuit conductors may be electrically connected in a suitable manner. These electrodes, for example, may comprise a relatively thin coating of suitable metal such as gold or silver applied, for example, by the process of thermal evaporation directly to the surfaces of the plate. Again, they may take the form of suitably shaped, separate metal plates held in contact with portions of the surface of the plate by suitable means, such as springs.) One purpose of so mounting the plates is to prevent the possible condensation of moisture on the surfaces thereof due to rapidly fluctuating external atmospheric conditions (pressure, temperature, humidity) such as are likely to be encountered during the flight of the plane. The operation of the plate would be seriously interfered with if droplets of moisture were to form on the surfaces of the plate due to such condensation.

During manufacture of the hermetically sealed crystal units, it is necessary of course to test the completed, sealed unit in order to determine the effectiveness of the seal; the method and apparatus of the present invention are particularly applicable in connection with the testing of such units and the invention will be described as so applied. It will be understood of course that the invention is not limited in its application to this particular use.

A feature of the present invention is means, surrounding the exposed portions of the terminal pins of the sealed holders being tested, for preventing sparking between such exposed portions.

There is disclosed in the copending application Serial No. 528,013, filed March 24, 1944 in the name of G. W. Willard, entitled Method of and apparatus for measuring pressure a novel arrangement for testing sealed containers which is based on the discovery that the gas pressure around two opposed or separated electrodes, i. e., electrical conductive members or elements, may be determined by measuring current flow, at constant voltage above the minimum sparking voltage, between two electrodes, i. e., the method depends upon the variation of an ionization current between a pair of electrodes (for a given voltage) with changes in the pressure of the gas surrounding the electrodes. So far as the range of pressures in which the arrangement is designed to function is concerned, the ionic current increases as the pressure of the gas decreases.

The arrangement of the present invention is applicable particularly in connection with the testing method and apparatus disclosed in the copending application referred to and will be so described herein.

In accordance with a specific embodiment of the arrangement referred to above, test equipment designed to test a plurality of hermetically sealed quartz plate holders comprises a cabinet on which is mounted an evacuation chamber. A vacuum pump for evacuating the chamber to the desired level, a pressure regulator, pressure gauges, voltage supply means, current meter and other incidental items of equipment are provided certain of which may be mounted on or within the cabinet. A socket plate is mounted in the lower portion of the evacuation chamber for removably supporting the sealed crystal holders which are to be tested. In use the holders to be tested are mounted on the socket plate within the evacuation chamber, the cover thereof is closed and sealed thereby completing a gas-tight enclosure around the holders and the pressure within the chamber is lowered to the particular level predetermined in accordance with the requirements of the test. After maintaining this level for a predetermined time, a regulated, i. e., a current-limited, voltage is applied across the terminals of each sealed holder in turn and the corresponding ionic current flow (if any) between the separated or opposed electrodes within the respective holder is measured. The intensity of the ionic current flow will be an indication of the pressure of the air or other fluid within the respective holder and it may be readily observed therefore how much, if any, the pressure within the holder has dropped due to leakage through the seal to the surrounding area of lowered pressure.

Magnitudes of pressure will be defined herein by the terminology commonly followed in the scientific and technical publications, i. e., the term "a pressure of eight inches of mercury," for example, means a pressure that will just support a column of mercury eight inches in height; "a pressure of one-half inch of mercury" means a pressure that will just support a column of one-half inch in height and so on. Similarly the term "ambient pressure" is used in its commonly accepted sense to define the pressure immediately surrounding the object or area in question. The term "gas" is used in the usual scientific sense and is intended to include atmospheric air. While the term "hermetically sealed" is used at various points herein in reference to containers the seals of which are being tested to determine whether or not the seal is effective to meet specified requirements which in some instances may permit a slight leakage, it is of course understood that, in the exact sense, the term "hermetically sealed" should be applied only when the seal is perfect, that is, when it will entirely eliminate leakage between the interor of the container and the surrounding area. For purposes of the present description, the term "ionic current" should be taken as inclusive of current arising through "breakdown" between separated portions of the physical conductors resulting, for example, in sparking or current across space but noninclusive of current flowing only in the physical conductors themselves or between the elements of a battery or other potential source not involvng gaps or spaces.

Fig. 1 is a front elevational view of an arrangement for testing hermetically sealed containers which embodies features contemplated by the present invention;

Fig. 2 is a side elevational view of the device illustrated in Fig. 1;

Fig. 7 is an enlarged sectional view of a portion of the socket plate taken on line 7—7 of Fig. 6, showing particularly the arrangement of the spring jack terminals in the socket plate and illustrating the novel means for preventing sparking contemplated by the invention;

Fig. 9 is a sectional view of a sealed crystal plate holder of a type that may be tested by the contemplated arrangement, a piezoelectric crystal plate being shown mounted within the holder;

Fig. 10 is an end sectional view of the crystal plate holder of Fig. 9;

Fig. 11 is a schematic showing of the electrical circuit utilized by the testing arrangement;

Fig. 14 is a curve illustrating leakage rates for three different magnitudes of leak; and Fig. 15 is a sectional view of a form of auxiliary spark gap.

Figure 3:
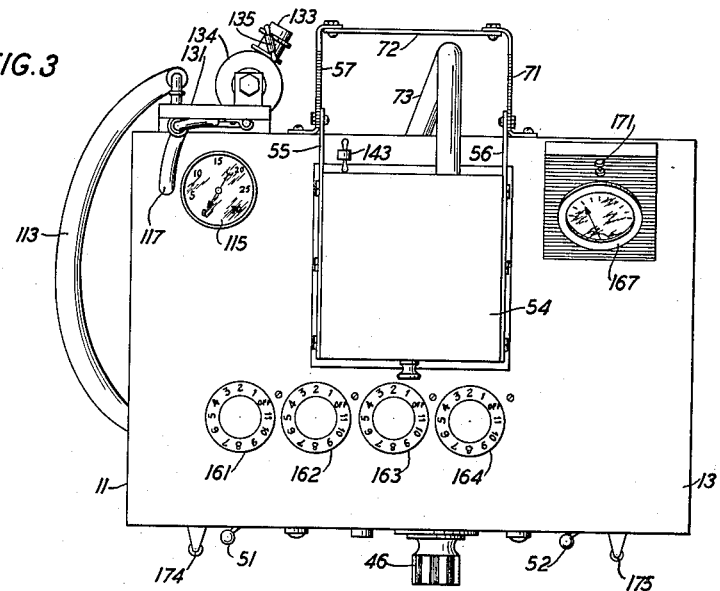
Fig. 3 is a plan view of the device illustrated in Fig. 1.

Referring now to the drawings, there is illustrated a testing device comprising a cabinet 11 which is provided with a removable front panel 12 and removable top panel or cover plate 13. As shown particularly in Fig. 5, front panel 12 and the associated apparatus mounting base 14 may be removed as a unit from the cabinet. Plug-type connectors 15 and 16 within the cabinet 11 (see Fig. 4) engage the jack-type connectors 17 and 21, respectively, (Fig. 5) when base 14 is in position within cabinet 11 thereby maintaining electrical continuity between equipment carried by the removable unit and equipment carried by the cabinet proper. Similarly, top panel 13, as indicated most clearly by Fig. 4, may be readily removed as a unit from the cabinet; plug assembly 18 and jack assembly 19 cooperate when panel 13 is in closed position on the cabinet to maintain electrical continuity between the respective equipment elements.

Figure 5:
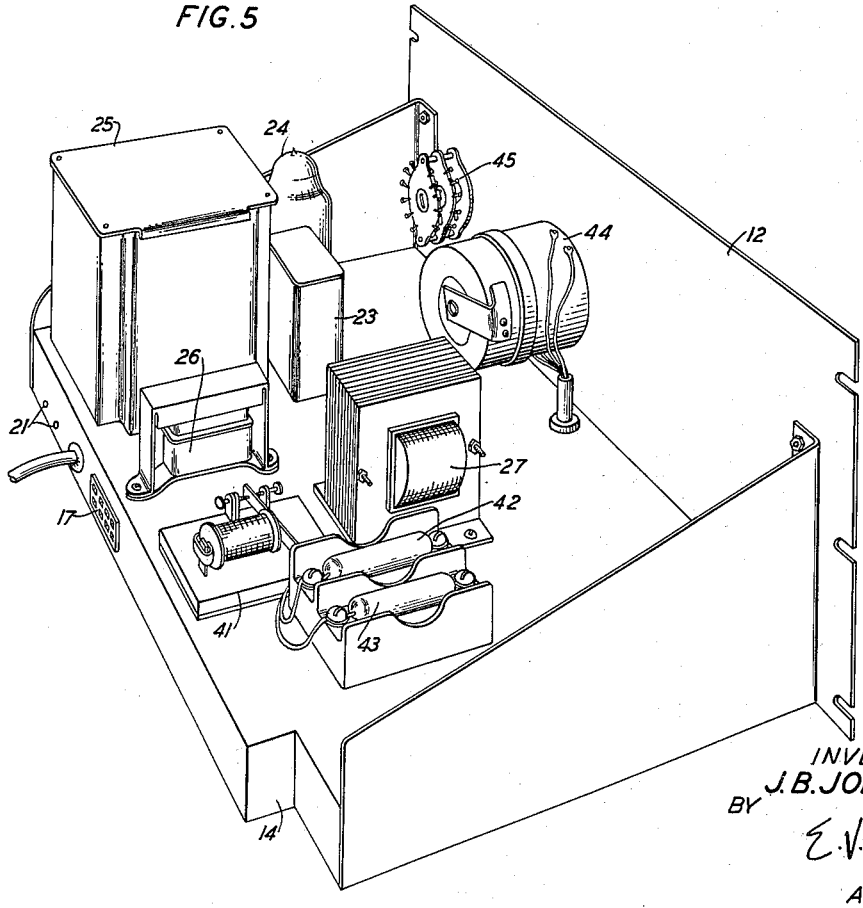
Fig. 5 is a perspective view of the front panel and associated mounting base taken from the rear.

As shown particularly in Fig. 5, several equipment units are mounted on base 14 and front panel 12. These units, the function of which will become apparent from subsequent consideration of the schematic circuit and other portions of the specification, include condenser 23, vacuum tube 24, transformers 25, 26 and 27, relay 41, fuses 42 and 43 with suitable fuse holders, voltage adjusting autotransformer 44 and resistance element selecting switch 45. The resistance elements are preferably mounted directly on the two plates of switch 45, several of the elements being shown in the drawing. As shown in Fig. 1, dials 46 and 47 are provided for operation of voltage and resistance selectors 44 and 45, respectively. Off-on switches 51 and 52 are also mounted on panel 12.

Figure 6:
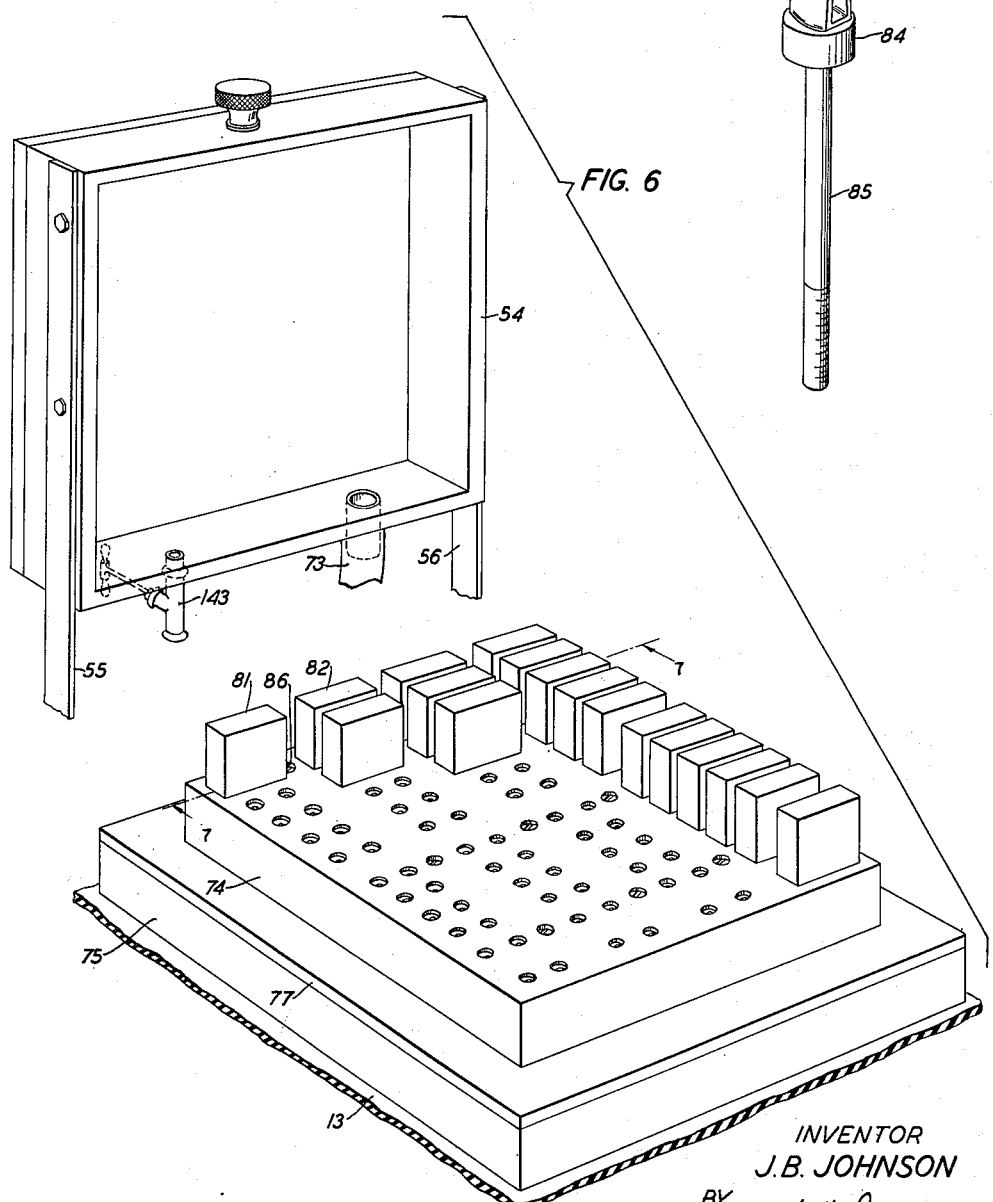
Fig. 6 is a view in perspective of the evacuation chamber with the cover in raised position to disclose a number of crystal plate holders mounted in position for testing.

Evacuation or vacuum chamber 53 is mounted on top panel 13, being shown with cover 54 in closed position in Figs. 1, 2 and 3 (in which position a gas-tight enclosure is formed) and with the cover in open position in Fig. 6. Cover 54 is supported, somewhat loosely, by hinge arms 55 and 56 which are rotatably attached by suitable bolts or other pivots to upright members 57 and 71, respectively. Members 57 and 71, together with top cross bar 72, act as a support for cover 54 when it is in raised or open position. As apparent from Figs. 2 and 3, members 57 and 71 extend down the rear of cabinet 11 to the base thereof and act also as a guard for exhaust tube 73.

As shown clearly in Figs. 6 and 7, evacuation chamber 53 comprises, in addition to cover 54, a socket plate 74 of suitable insulating material and base-plate 75 also of suitable insulating material, gasket 76 being positioned between the two plates. A second gasket 77 is positioned on the exposed upper surface of plate 75 and serves to seal the chamber when cover 54 is in closed position.

As shown in Fig. 6, the socket plate is provided with a plurality of pairs of apertures, sockets, or holes, the number of pairs of holes determining the number of sealed holders or containers that can be tested at one time. (The capacity of the set illustrated, therefore, is forty-four holders although the capacity may be made greater or less as desired.) The two holes of each pair are properly spaced to receive the two terminal pins of a respective one of the holders being tested. A number of hermetically sealed holders, as 81 and 82, are shown in position for testing in Fig. 6.

Figure 8:
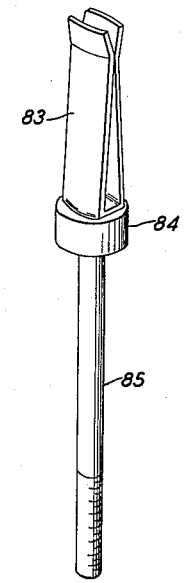
Fig. 8 is a view in perspective of one of the spring jack terminals.

A spring clip or jack terminal assembly of the type shown in Fig. 8 is associated with each of the holes of the socket plate. Each terminal assembly comprises a socket or jack portion 83, a shoulder 84 and a threaded bolt portion or stud 85. As shown in Fig. 7 a soldering lug is positioned on each bolt portion of the terminal assemblies, being held in place by a nut. For example, soldering lug 101 is held on bolt 85 by nut 102. These soldering lugs facilitate the electrical connection of conductors (leading to apparatus to be described subsequently) to the respective bolts or studs and thence to the socket portions of the terminal assemblies. Conductors 103, 104 and 105 are shown in part in Fig. 7.

Figure 4:
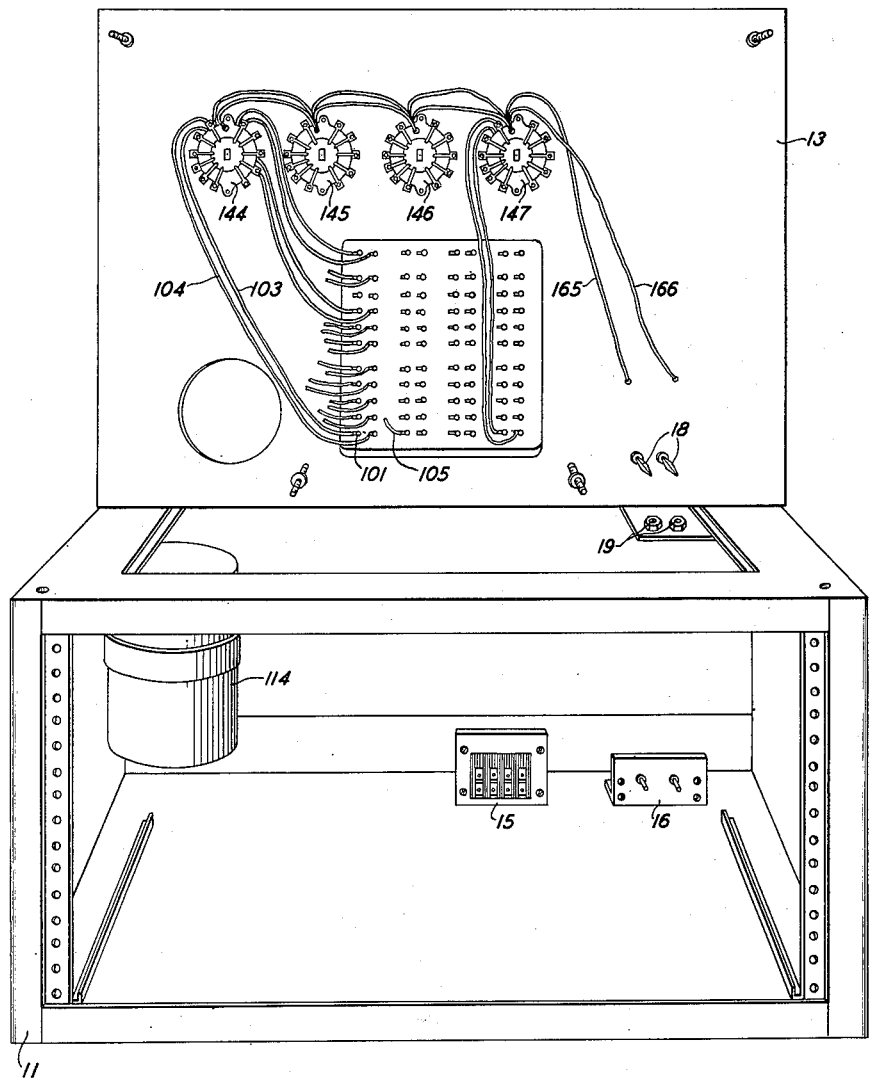
Fig. 4 is a perspective view of the cabinet of the arrangement of Fig. 1 with the front panel and associated apparatus mounting base removed and with the top panel in raised position to show the underneath side thereof.

It will be apparent from Figs. 7 and 4 that the spring contact or terminal assemblies act not only as electrical connecting members but also as mechanical elements for sealing the holes in base-plate 75, shoulders, such as shoulder 84, being effective for this purpose. Socket plate 74 is held in its proper registering position on base-plate 75 by a number of suitable screws, screw 86 being shown in Fig. 7. Socket plate 74 may be easily removed by removal of these screws without disturbing the seal effected between gasket 76 and base-plate 75 by the shoulders (such as shoulder 84). The novel construction is such that the evacuation chamber proper is sealed by gasket 76 so that when cover 54 is in closed position and is sealed by gasket 77 and when the chamber is evacuated through exhaust tube 73, the "base" of the chamber so far as changes in atmospheric pressure are concerned comprises gaskets 76 and 77. The shouldered portions provided on the terminal assemblies, as shoulder 84, are effective in bringing this sealing action about.

The novel construction of the evacuation chamber is such that the socket plate may be easily removed for cleaning and the stud, or bolt, mounting may be easily replaced. Further the novel form of contact terminals utilized and the spacing thereof in the socket plate permit testing of holders having slightly different types of pin terminals. In the event that it be desired to test containers having a terminal arrangement substantially different than that of the holders illustrated, top panel 13, which carries socket plate 74 and associated wiring as well as the switches and meters referred to above, may be easily removed and replaced by another top panel provided with a socket plate arranged to accommodate the particular terminals involved. The provision of the jack and plug-type connection (plugs 18 and jacks 19, Fig. 4) referred to above facilitates the removal of one top panel and replacement thereof by another; (meter 167 and associated switch 171 are preferably jack mounted so that they may be readily removed from one panel and replaced on another).

It will be evident that with holder 81 in position as indicated in Fig. 7, conductors 103 and 104 will be electrically connected through jack terminals 83 and 108, respectively, to terminal pins 106 and 107, respectively, of the holder; terminal pins 106 and 107 in turn are electrically connected to the respective electrodes for the crystal plate mounted within the holder.

As mentioned above, evacuation chamber 53, when closed and sealed by cover 54, may be exhausted to the desired pressure level through exhaust tube 73. The apparatus utilized in bringing the pressure within the evacuation chamber to various desired levels (by a method which will be described in detail subsequently) includes a vacuum pump 111 driven by motor 112. Pump 111 is connected through tube 113 to oil trap 114, entering the latter through the base thereof. Exhaust tube 73, which, as stated above, is connected to the evacuation chamber 53, is also connected to oil trap 114 entering the latter through the top cover thereof.

Gage 115, which may be one of the ordinary types of steam vacuum gage and which is connected to oil trap 114 through a suitable tube or pipe leading through the top cover thereof, provides an immediate indication of evacuation when pump 111 is started and also gives a rough indication of the pressure within the system so long as the pressure is not too low (where barometric changes have an excessive effect on the reading of such a gage), say above a pressure of approximately ten inches of mercury. Such a gage of course reads pressures below atmospheric, rather than the absolute pressure. For accurately measuring and indicating pressures below 10 inches of mercury, mercury manometer 116 is provided. Manometer 116 is connected to oil trap 114 by tube 117 which enters through the top cover thereof. Back plate 131, which is attached to the rear of cabinet 11, acts as a support for manometer 116 and its scale.

A pressure control auxiliary is provided for the purpose of keeping the absolute pressure in the evacuation chamber from going below a predetermined value, for example, below a pressure in the neighborhood of one-half inch of mercury. (The purpose of such a control will be brought out subsequently.) This control auxiliary includes closed mercury manometer switch 132 (Fig. 13) which is controlled by absolute pressure and which operates through holding relay 41, (Fig. 5) solenoid-operated valve 134 which in turn controls the admission of air through inlet pipe 133. Inlet pipe 133 enters oil trap 114 through the bottom thereof. An adjustable needle valve 135 is associated with solenoid valve 134.

Figure 13:
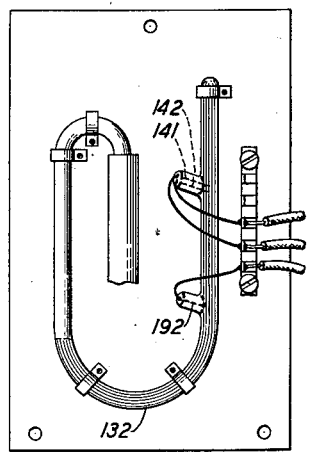
Fig. 13 is a view of the mercury manometer switch.

As indicated most clearly in Figs. 13 and 11 manometer switch 132 may be adjusted to approximately maintain any desired pressure within a certain range by adjusting its tilt.

When the pressure within evacuation chamber 53 falls below the predetermined minimum value, for example one-half inch of mercury, valve 134 opens and allows air to leak into the system through inlet tube 133 at a rate which is controlled by adjustable valve 135 and which is slightly faster than the pumping rate, until the pressure rises to a predetermined maximum value, for example, five-eighths of an inch of mercury, at which point valve 134 closes and the cycle is repeated.

Release valve 143 is mounted on the rear of evacuation chamber 53; this valve may be opened upon completion of a test to permit air to enter evacuation chamber 53 in order to bring the interior thereof back to atmospheric pressure, before opening the cover.

Four double-tier selector switches are mounted on top panel 13, the lower switch in each respective pair being shown in Fig. 4. The switches shown are designated respectively 144, 145, 146 and 147. A knob is provided for rotating each pair of switches, these knobs designated 161, 162, 163 and 164 being shown in Figs. 1 and 3. As shown most clearly in Fig. 11 and as indicated in Fig. 4, each of the switches of one set has one terminal connected to one common conductor of the testing circuit while each of the switches of the other set has one terminal connected to a second common conductor of the circuit. Thus switches 144, 145, 146 and 147 of the "lower" set each have a terminal connected to conductor 165 while the switches of the "upper" set each have a terminal connected to conductor 166. Corresponding individual switching terminals of the switches are connected to the respective pairs of spring, clip or jack terminals as indicated in Fig. 4.

In the embodiment of the invention selected for disclosure wherein the socket plate is designed to mount forty-four holders arranged in four rows of eleven holders each, each set of selector switches is arranged for control of one of the four rows and each switch is provided with twelve terminals, one terminal in each case corresponding to the "off" position of the respective switch, the other eleven corresponding to the eleven holders to be tested.

Microammeter 167, together with switch 171 for shorting the circuit beyond the meter (i. e., shorting leads 165 and 166, Fig. 11) is mounted on top of panel 13. Lamp indicators 172 and 173 are mounted on front panel 12 and associated respectively with switches 51 and 52. Hand grips 174 and 175 are also mounted on the front panel to facilitate removal and replacement of the same. Fuses 176 and 177 may be replaced from the front of the panel (Fig. 1).

For purpose of further describing the arrangement and operation of the invention, it will be assumed that a number of hermetically sealed crystal plate holders of the general type illustrated in Figs. 9 and 10 are to be tested. The holder selected for illustration is of the so-called "pressure" type, i. e., piezoelectric plate 181 is positioned between electrodes 182 and 183, which are in the form of metal plates, and firm contact between the piezoelectric plate and the electrodes is assured by spring 184 while a second spring 185 aids in maintaining the assembly in proper position within the holder. Terminal pins 106 and 107 are connected to the respective electrode plates by suitable means. Shoulder portions 186 and 187 are provided on respective pins 106 and 107. The holders are placed in position on socket plate 74, as shown in Fig. 6, the respective terminal pins of the holders being positioned in the proper apertures in the socket plate. (Forty-four holders may be mounted in the socket plate illustrated but it will be understood that socket plates with greater or less capacity may be utilized, as desired.)

After the holders to be tested are placed in position, cover 54 is closed against gasket 77, to seal evacuation chamber 53, release valve 143 is closed and evacuation pump 111 is started. The holders should be carefully seated in position so that no appreciable gap will be allowed between the base of each holder and the adjacent top face of the socket plate. As described subsequently, however, there is a small but distinct passageway for air provided between the holder base and the face of the socket plate so that there will be an occasional air leakage between the upper surface of the socket plate and the adjacent surface of the holders; in other words, the "base" of the evacuation chamber proper is defined by gasket 76 and the shoulders of the jack terminals (as shoulder 84, Fig. 7) and not by the upper surface of socket plate 74 and the engaging surfaces of the holders.

As soon as pump 111 is started, gage 115 should indicate (by an increasing vacuum reading) a lowering pressure assuming that a good seal has been attained between cover 54 and gasket 76. If gage 115 indicates that the apparatus is operating satisfactorily, the exhausting process continues until mercury manometer 116 indicates an absolute pressure in evacuation chamber 53 of about one-half inch of mercury.

As the pressure in the evacuation system is lowered, the mercury in manometer switch 132 will "fall"; i. e., the level in the right half of the U tube will drop and the level in the left half of the tube will rise, Figs. 11 and 13. So long as the level in the right half of the tube is sufficienty high to engage either terminal 141 or 142, relay 41 will be held operated by current supplied from the secondary winding of transformer 27 over conductor 191, operating winding of relay 41, terminal 192 and back to the other side of the secondary winding of transformer 27 over either of two paths depending upon the mercury level, i. e., either from terminal 141 over conductor 193 and from terminal 142 over conductor 194 and make contact of relay 41 in parallel if the mercury be high enough to contact terminal 141 or from terminal 142 over conductor 194 and make contact of relay 41 alone if the mercury be in contact with terminal 142 but out of contact with terminal 141. However, as soon as the level of the mercury in switch 132 drops below terminal 142, the operating circuit of relay 41 will be broken and the relay will release.

As soon as relay 41 releases, solenoid-operated valve 134 will be operated over a path which includes conductors 195 and 196, break contact of relay 41 and conductor 197. Operation of valve 134 allows entry of air into the evacuation system through inlet pipe 133 thereby raising the pressure within evacuation chamber 53. The rate of entry of the air is governed by the position of adjustable leak valve 135. As the pressure in the system is now raised due to admission of air through inlet pipe 133, the mercury will rise in the right-hand half of the U-tube of switch 132 until contact is made with upper terminal 141 whereupon relay 41 is operated and valve 134 moves back to closed position thereby closing inlet pipe 133. The cycle is then repeated continuously.

It will be noticed that, while the operating circuit of relay 41 is not completed until the mercury reaches upper terminal 141, i. e., it is not completed when the mercury reaches the lower terminal 142, the relay, once operated, will be held operated until the mercury drops below the lower terminal 142. The pressure is thereby automatically fluctuated in the range between a selected maximum pressure, which may be, for example, five-eighths of an inch of mercury, and a selected minimum which may be, for example, one-half inch of mercury.

Needle valve 135 may be adjusted as desired to regulate the admission of air during the periods valve 134 is open.

The reason for maintaining the pressure within evacuation chamber 53 above a predetermined minimum will be clear from subsequent portions of the description. If for any reason, for example, it is to test the whole vacuum system for leakage, it is desired to obtain a pressure lower than the "predetermined minimum," needle valve 135 may, of course, be closed temporarily.

After chamber 53 has been evacuated to the desired low pressure and has been maintained at such low pressure a period of time determined by the particular testing instruction, the testing of the individual holders is started. (The period of testing time is normally measured from the moment at which solenoid switch first operates, i. e., about one minute after starting the pump.) The test voltage is turned on and regulated to the desired value by operation of voltage regulating transformer 44 adjusted by dial knob 46. The value of the applicable voltage may be read by closing switch 171 momentarily and noting the reading on microammeter 167; it will be assumed that transformer 44 is adjusted for a reading of 30 microamperes on meter 167 when switch 171 is closed. For such adjustment of transformer 44 any one of five definite voltages may be obtained depending upon the position of selector switch 45 operated by associated dial knob 47; switch 45 has five positions, labeled 2 to 6 on the dial, and is shown in Figs. 1 and 11 in position No. 3. It will be assumed that with the adjustment of transformer 44 referred to, voltages of 600, 900, 1200, 1500 and 1800 volts, respectively, are obtained with the five settings of switch 45, since the respective switch settings introduce into the circuit respective resistances of 20, 30, 40, 50 and 60 megohms. These resistance elements are effective to limit the current passed through the holders to a maximum value of 30 microamperes.

The first of the forty-four holders to be tested is now selected by operation of the proper pair of the four pairs of selector switches 144, 145, 146 or 147 controlled by knobs 161, 162, 163 and 164, respectively. (These selector switches are left in the normal "off" position except when actually in use for selecting a holder in the row controlled by a respective switch.) It will be assumed that the first holder to be tested is holder 81 which occupies the first position in the row of eleven holders controlled by "lower" selector switch 144 and "upper" selector switch 203 (Fig. 11) of the same set. Switches 144 and 203 are moved to position "1" therefore by rotation of dial 161 thereby connecting testing circuit conductor 166 to conductor 103 and testing circuit conductor 165 to conductor 104, respectively. It will be apparent from reference to Figs. 4, 7, 9 and 11 that the testing voltage is now applied across terminal pins 106 and 107 of holder 81 which is being tested. Terminal pin 107 of the crystal holder is connected by a suitable conductor provided within the holder to one electrode 182 of crystal plate 181 (Fig. 10) while terminal pin 106 is connected to the other electrode plate 183.

Figure 12:
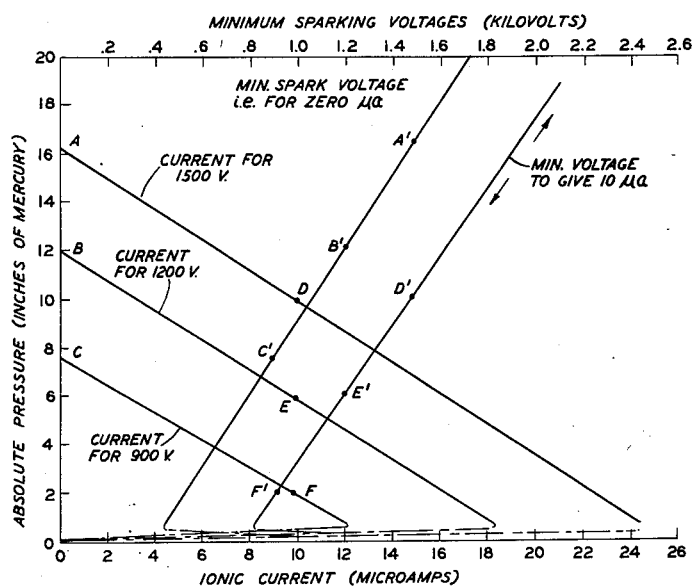
Fig. 12 is a curve illustrating the relationship between pressure and ionic current for a number of different voltage values.

Now, as set forth more in detail in the copending application referred to above, it has been discovered that in a case such as this there is a definite relationship, changing as the applied regulated voltage is changed, between the ionic current flow (if any) across the gap between the two electrodes of the crystal plate and the gas pressure within the holder and surrounding the plate. This relationship, for three different test voltages and for a specific type of holder and electrode arrangement, is shown by the curves of Fig. 12. For example, assuming a test voltage of 1200 volts, it will be noticed that the ionic current is zero for pressures of twelve inches of mercury and over, and gradually increases as the pressure drops below twelve inches, reaching a maximum of approximately 18.5 microamperes at a pressure of approximately one-half inch of mercury.

It will be noticed from the curves of Fig. 12 that once a "critical" pressure in the neighborhood of one-half inch of mercury has been reached, any further decrease in pressure results in an abrupt drop of the ionic current to zero. This is the reason for the provision of the arrangement described above whereby the pressure within the evacuated chamber is held above a predetermined minimum value. In other words, the arrangement is designed to operate in a pressure range which is not permitted to fall below approximately one-half inch of mercury, the exact value depending upon the type of holder and electrode arrangement.

The path followed by the ionic currents (if set up) across the gap formed by the crystal plate may vary according to the interior arrangement of the holder, the size, type and shape of the electrodes and other factors. In the instance of the type of holder and crystal plate selected for illustration, it has been observed that the ionic current usually follows paths leading between the peripheral edges of the two opposed faces of the metal electrode plates 182 and 183 (Fig. 10).

It is of course desirable that no ionic current flow be set up between the exposed portions of the terminal pins, i. e., the portions outside of the holder under test, as this would defeat the attempt to determine the conditions within the holder. It is apparent, however, that these portions must themselves be in the low pressure area since one of the most likely places of leakage is the point at which a terminal pin enters the holder. It is not feasible, therefore, to hermetically seal off these portions of the terminal pins from the low pressure region but it is necessary to provide open passages for the flow of air from areas near the base of the terminal pins to the region of reduced pressure.

Now, in accordance with the novel features of the present invention, the establishment of ionic current flow between the exposed portions of the terminal pins, which as stated above are in the low pressure region, is prevented in a unique and effective method. Briefly, according to this novel method, the passages provided for flow of air, while of sufficient area for the purpose provided, i. e., to permit the rapid flow of air in the event of leakage of air at the base of the terminal pins, are narrowed or constricted by insulating walls sufficiently to be effective in preventing the establishment of undesired current flow between the terminal pins.

The underlying theory which according to applicant's present opinion accounts for the successful functioning of the method may be explained something as follows. Electric breakdown in a narrow passage between insulating walls is impeded and the likelihood of its occurring is lessened by charges that tend to collect on the walls in such a way as to oppose the fields which are tending to set up the flow of current. To explain the theory further, if a pair of ions be formed in the space between two opposed electrodes, i. e., the two terminal pins in our case, by some cause or other, these ions could normally start a cumulative process of ionization, assuming that the conditions of voltage and pressure are favorable as they are in our present case. This cumulative process would ultimately result in the flow of a steady ionization current. However, if now, in accordance with the features of the present invention, the passage between the electrodes be constricted by insulation the ions will then often strike one of the walls of the passage defined by the insulation and will adhere thereto instead of passing on to their respective electrodes with cumulative ionization. Ions of one kind adhering to a wall will attract and neutralize ions of the opposite kind and this tends to clear the passage of ions thereby decreasing very materially the likelihood of the current growing up to the steady, self-sustaining condition.

The passage should be very narrow, i. e., of the order of a mil or so; it is difficult to establish the exact, most favorable, dimension according to a general rule and it can best be determined by experimentation in each case. Ions move in the passage under the influence of the electric field between the electrodes (terminal pins) but with frequent diverting collisons with molecules of the gas (air). The passage should be so dimensioned that an ion, in its motion, would be much more likely to strike the insulating wall than to traverse the passage longitudinally without striking the wall.

Considering now the practical embodiment of the above method in the testing apparatus referred to above and referring particularly to Fig. 7, it will be seen that socket plate 74 is provided, in addition to the apertures of proper size to receive the terminal pins, with enlarged portions of each such aperture which are of proper diameter to accommodate the shoulders of the respective terminal pins. Thus, as illustrated, shoulders 186 and 187 of terminal pins 106 and 107 are seated in the respective enlarged apertures provided when the pins are positioned in the respective sockets 83 and 108. The depth of these enlarged apertures is carefully determined and is such that when the holders are in position on the socket plate a passage for the flow of air will be established between the upper face of the socket plate and the adjacent face of the holder which will be of sufficient area to permit the rapid flow of air but will, at the same time, be sufficiently constricted, in accordance with the theory discussed above, to prevent the establishment of ionic current flow between the respective pairs of terminal pins. Actually, as indicated by the legend of Fig. 7, the space between the face of the socket plate and the face of the holder will be of the order of a few mils only and will not be readily discernable to the observer.

It will be readily apparent from Fig. 7 that the novel arrangement of socket plate 74 is such that not only is the establishment of ionic current between the terminal pins prevented, but the establishment of such current between adjacent sockets, as 83 and 108, is also prevented. In view of the manner in which each socket is surrounded by the dielectric, it will be apparent that the only possible path for current flow between sockets 83 and 108, for example, would be from one socket up through the associated aperture, to the surface of socket plate 74 and down to the other socket through the associated aperture; establishment of ionic current over such a path will be unlikely due both to the length of the path and to the constricted area encountered at the surface of the socket plate.

It will be understood, of course, that the socket plate will be designed in accordance with the type of holder that is to be tested; particularly the depth of the enlarged portions of the apertures will be carefully determined in accordance with the area of the shoulders on the terminal pins of the holders. However, in the event that the socket plate is not provided with the enlarged apertures necessary to accommodate the shoulders of a holder to be tested, a spacer of suitable dielectric material, provided with properly spaced and dimensioned apertures to accommodate the shoulders of the terminal pins, may be positioned between the socket plate and the holder. Or again, a strip of suitably dimensioned dielectric may be so positioned between the holder and the socket plate as to occupy substantially all the space between the two terminal pins of each respective pair of pins. In the event that during a test, certain positions on the socket plate are vacant, i. e., not occupied by holders, it may be well to place a sheet of dielectric over the vacant apertures in order to prevent possible ionic current flow from one socket to an adjacent socket in the manner referred to above.

Returning now to consideration of the testing procedure as applied to holder 81, it will be apparent from the above that as the testing voltage which we will assume is regulated at 1200 volts, is applied across terminals 106 and 107 of the holder, the resulting ionic current flow, if any, across the crystal plate within the holder will be an indication of the pressure within the holder; the intensity of ionic current flow will be indicated by microammeter 167, switch 171 being open (Fig. 11).

It will be obvious that if holder 81, which it will be remembered was sealed at atmospheric pressure, is imperfectly sealed and subjected to leakage, i. e., if a true hermetic seal was not obtained, the pressure within the holder will drop, i. e., air will escape therefrom, during the exhausting of the evacuation chamber and maintenance of the pressure therein at the low point under which the tests are carried out. The amount of leakage from holder 81 to the lower pressure surrounding it will depend, of course, on how imperfectly the holder has been sealed.

As the testing voltage is applied, if no ionic current flow be registered, this will indicate that the pressure within holder 81 is twelve inches of mercury or higher (curve of Fig. 12). However, if ionic current of, for example, 8 microamperes be registered, this will indicate that the pressure within holder 81 has dropped to approximately seven inches of mercury and so on. Interpretation of these results will depend upon the requirements of the particular test, for example, it may be that all holders showing any ionic current flow at all will be rejected or it may be that only those showing ionic current flow greater than a predetermined value will be rejected.

After holder 81 has been tested, the selector switch comprising "lower" switch 144 and "upper" switch 203 will be operated to selectively test the other ten holders in the row. In the same manner the other three sets of selector switches will be operated in turn to test the holders in the other three rows until the entire forty-four holders have been tested. A suitable record will be kept during the tests from which the faulty holders may be identified. The entire testing procedure takes very little time as only a few seconds are required for testing each holder, that is, just sufficient time to observe whether ionic current is passed or, if the requirements of the test are such as to necessitate it, the intensity of such current.

Upon completion of the tests, release valve 143 is opened and pump 111 is stopped. When the vacuum has been entirely relieved, cover 54 is opened and the holders are removed from socket plate 74. Those holders identified as defective are then set to one side for repair and resealing.

Before making the above tests, if it be suspected that any of the holders are subject to conduction shorting, i. e., have a low resistance leakage path between their terminal pins through the base of the holder or becauses of contamination on the crystal, such holders should be tested for resistance before evacuation by application of the contemplated test voltage. Any that show current readings at atmospheric pressure cannot be tested for leakage. Conduction shorts that might not be detected otherwise, for example, by use of low resistance ohm meters, will be indicated at the higher voltages used in the present arrangement.

If desired, an audible or visual signal (indicated by box 206, Fig. 11) may be incorporated in the circuit; such a signal which may take the form of a bell or lamp for example, facilitates the detection of defective holders as it makes it unnecessary to watch meter 167. The signal unit may comprise, by way of example, a resistor connected as a series element across which the ionic current will produce a voltage drop, an amplifier for amplifying this voltage drop, a sensitive relay operated by the amplifier output and a visual or audible signal in the local circuit of the relay. Suitable adjustment of the signal unit may be made in accordance with the testing requirements; i. e., in accordance with the minimum ionic current which it is desired to indicate or detect.

It will be understood, of course, that the particular type of holder illustrated in Figs. 9 and 10 has been selected by way of example only and that the arrangement may be used in testing other types of holders. The absolute pressure-ionic current curves for different types of holders will be generally similar to that of the pressure type holder (Fig. 12) but may differ in values. Data for plotting typical curves for different types of holders may be obtained by making tests of assembled, but unsealed, holders of the respective type involved.

Among the particularly valuable features of the testing arrangement described above is the ease with which the conditions under which the holders are tested may be accurately varied in accordance with varying requirements of the testing requirements. For example, the "severity" of the test may, of course, be increased by lengthening the period of time during which the holders are subjected to the lowered pressure within the evacuated chamber before the observational steps of the test are commenced. Also by simple switch adjustment any one of a number of different testing voltages may be selected. Further the holders need not be immersed in liquid during the test; many previous testing arrangements utilized immersion in water or other liquid, often with harmful results.

Another particularly valuable feature of the arrangement resides in the fact that it permits the measurement of magnitude of leaks or leak rates with consequent rejection of holders showing leaks greater than any predetermined allowable leak rate. In this connection magnitude of a leak is intended to mean the time required for the pressure within a holder to drop from one atmosphere to one-half atmosphere when the holder is immersed in a perfect vacuum, the time being counted from the instant of immersion. (For a stable leak the above might be restated as the time required for the internal pressure to drop to one-half the difference between the external and internal pressures.) For example, if a holder sealed at atmospheric pressure is placed in a vacuum chamber which is evacuated to a negligible pressure in a negligible time, and if the pressure within the holder drops to one-half atmosphere in five minutes the leak is referred to as a five-minute leak. There is illustrated in Fig. 14 curves showing the leakage rates for three different magnitudes of leak, i. e., two and one-half, five and ten-minute leaks. As clearly shown by these curves, the pressure within a holder with a five-minute leak falls to one-half atmosphere in five minutes, that of a holder with a two and one-half minute leak in two and one-half minutes and that of a holder with a ten-minute leak in ten minutes. Also that the pressure in the first-mentioned holder falls to one-quarter atmosphere in ten minutes, to one-eighth atmosphere in fifteen minutes and so on. Curves of this nature may be utilized to advantage in conjunction with the absolute pressure-ionic current curves of a particular type of holder for setting the time required for leak testing under specific electrical settings.

While the testing arrangement in connection with which applicant's invention is particularly applicable has been described in connection with the testing of hermetically sealed crystal plate holders that have been sealed at atmospheric pressure, it may be used, of course, for testing other types of containers, suitable modifications being made in the socket plate as required. Further, the arrangement may be utilized for testing the seal of containers that have been sealed at pressures other than atmospheric pressure. The arrangement may be used, for example, in testing such sealed devices as electrical condensers and, in short, may be adapted generally to the measurement of degrees of vacuum or pressure within enclosures or in space. The arrangement is intended to function, however, only when the pressure being measured does not fall below one-half inch of mercury. It is realized that in some instances the separated electrodes provided within the container in connection with the normal function of the device may not be adaptable to use in connection with the present method and that in other instances the enclosure may not normally be supplied with separated electrodes of any nature, and it is contemplated that in such instances a set of electrodes be provided within the container for the express purpose of utilization in the method of the present invention.

In instances such as mentioned in the closing sentence of the above paragraph, i. e., where for one reason or another a set of electrodes is to be provided for the express purpose of pressure measurement, it is obvious that it will be advantageous to provide electrodes of a type that will tend to produce a stable and controllable spark gap. Among the types of spark gaps that may be used are those formed by opposed ball electrodes, crossed opposed cylindrical electrodes or opposed rounded plate electrodes; these electrodes may be made of non-sputtering material such as aluminum, or gold may be utilized where long life is particularly desired. Also in the instance of metal enclosures, the auxiliary spark gap may be established between a single sealed-in insulated electrode and the adjacent wall of the container. There is illustrated in Fig. 15, for example, the manner in which a gap may be established between one terminal pin and the adjacent wall of the metal container; the terminal pin may be sealed in the container in the general manner illustrated in Fig. 3b of Patent 2,048,556 issued July 21, 1936 to E. D. McArthur.

While the method of pressure measurement described above involves ionization current values for a particular fixed voltage, it is contemplated that other procedure may be followed. For example, it is contemplated that pressure may also be measured by observing the minimum voltage required to give an ionic-current passage (or spark) reference being had to the "minimum sparking voltage" curve of Fig. 12. Further the minimum voltage required to give a current of $(n)$ $\mu a$ might be observed rather than a current that is just detectable; a curve of Fig. 12 shows minimum voltage to give 10 $\mu a$ current.

It will be noticed in referring to the curves of Fig. 12 that points A', B' and C' of the minimum sparking voltage-pressure curve correspond, respectively, to points A, B and C, respectively, of the ionic current-pressure curve and that points D', E' and F' of the 10-$\mu a$ curve correspond, respectively, to points D, E and F of the ionic current-pressure curve.

Although the use of direct current has been described in connection with the testing method, it will be understood that alternating current may be used in certain instances if desired.

In the event that the holders to be tested have been sealed at other than atmospheric pressure (it is pointed out above that the testing method is readily applicable in such instances), it must be ascertained and taken into account whether or not the holders remained up to the time of test in the same ambient pressure as that under which they were sealed. If it be established that the holders were subjected to a different ambient pressure it must be ascertained for how long a period they were so subjected; this procedure is necessary in view of the possibility that air may leak into, or out of, the holder during such period. The following specific procedures may be followed to advantage in testing holders which have been sealed at pressures other than atmospheric pressure.

First, in the event that the holders have been sealed at a pressure above atmospheric and have then been subjected to atmospheric pressure for a time ($t$), the sealing pressure and the time ($t$) must be considered when making the tests, assuming, of course, that time ($t$) and the difference in pressure are sufficient to indicate the possibility of appreciable leakage of air into, or out of, the holder before the test is started.

Secondly, in the event that the holder has been sealed at pressure ($P_1$) which is below atmospheric pressure but above one-half inch of mercury, the holder as sealed should give a large ionic current. If the holder is now placed at atmospheric pressure, the internal pressure will rise from ($P_1$) in the event that leakage occurs. Such holders may be tested therefore by a method which includes subjecting them to atmospheric pressure for a time ($t$) and then making the ionic current test at atmospheric pressure, (i. e., not in the vacuum chamber) during which test the smaller the ionic current the greater will be the indication of leakage. This is a simple and efficient method of testing holders where they can readily be sealed at pressures of from one-half to one inch of mercury.

Third, in the event the holder has been sealed at a pressure ($P_2$) which is below "critical" pressure (i. e., below one-half inch of mercury where the ionic current is maximum). Now by employing a test voltage sufficiently high to result in ionic current even at atmospheric pressure and by making two or more tests with the holder at atmospheric pressure (as outlined in the paragraph above) it can be determined whether the internal pressure has changed from the range of pressures in which ionic current increases with increasing pressure (pressures of zero to one-half inch of mercury) to the range of pressures in which ionic current decreases with increasing pressure.

It is also contemplated that a holder may be sealed with one gas confined within the holder which is then exposed to an atmosphere of a different gas. In such a case differential pressure, or diffusion of gases at same pressure inside of the holder and outside the same are depended upon to change the gas content and hence to change the ionic current flow.

While certain specific embodiments of the invention have been selected for illustration and detailed description, the invention is not, of course, limited in its application to these embodiments. The embodiments described should be taken as illustrative of the invention and not as restrictive thereof.

What is claimed is:

1. In a device for testing the effectiveness of the seal of a closed container that has been sealed at a certain gas pressure and has two spaced electrically conductive members extending from the exterior of said container to a point therewithin and constituting a plate for supporting a container being tested, said plate being provided with spaced apertures for receiving the respective terminal pins of said container mounted thereon, means including a sealable cover for said plate and containers for reducing the ambient pressure to a predetermined value which is lower than the pressure at which the container being tested was sealed, means for applying a regulated voltage across said conductive members while maintaining the pressure at the reduced value, and means for observing the magnitude of resulting ionic current flow between the respective portions of said conductive members within the container; and means for so spacing each container from the adjacent portion of the face of said plate that a passage is defined by the adjacent surfaces of the container and the plate of sufficient size to permit the free flow of air but sufficiently constricted to effectively prevent the ionization of the air passing therethrough.

2. Apparatus for measuring the respective gas pressures within a plurality of closed containers of the type enclosing a pair of separated electrodes each of which is connected to an external terminal of the respective container, comprising a mounting plate for supporting the containers being tested, a plurality of pairs of electrical contact terminal members, said contact terminal members being in cooperative position with respect to said mounting plate whereby each pair of said contact members engages the external terminals of a respective one of the containers being tested, and means including recessed shoulders engaging said external terminal for so spacing the containers being tested from said plate that a restricted passage is defined between said terminal members by adjacent faces of the containers and the plate of sufficient size to permit the free flow of air but having a lesser dimension of the order of a millimeter.

3. In a system for testing sealed containers of the type provided with two spaced projecting electrical terminal pin members by a testing procedure involving the application of a voltage across said electrical terminal pin members, means for reducing the gas pressure surrounding said containers and said electrical terminal pin members substantially below atmospheric pressure, means for supporting and connecting into the testing system the containers being tested comprising a plate, a plurality of apertures in said plate adapted to receive said electrical terminal pin members of the containers mounted on said plate for testing each of said apertures comprising three sections linearly arranged and coaxial the first of said three sections being in the form of a relatively shallow cavity the diameter of which is appreciably greater than that of the electrical terminal pin members, the second of said three sections being in the form of a relatively short cylinder the diameter of which is slightly greater than that of said electrical terminal pin members, and the third of said three sections being in the form of a relatively long cylinder the diameter of which is substantially the same as that of the said first section, an electrical contact member positioned in each of the said third sections adapted to receive terminal pin members, means for hermetically closing that end of each of said third sections farthest from the respective second section, the depth of said first aperture sections being so fixed that engagement of said terminal pins therewith will positively space said containers from the nearest portion of said plate a distance of the order of a millimeter.

4. The combination in a device for testing the effectiveness of the seals of selected ones of a plurality of crystal units enclosed in sealed containers and having spaced terminals projecting therefrom for electrical connection to elements therewithin, of means for receiving a plurality of said crystal units, including a mounting plate having a plurality of recesses therein arranged to receive said spaced terminals of crystal units to be tested, a connecting member disposed within each of said recesses and arranged to engage one of said spaced terminals therein, a cover for said mounting plate and crystal units, and means for sealing said cover about said mounting plate to form therewith an evacuable chamber, of means for spacing each of said units from said mounting plate to define therewith a path between said spaced terminals not exceeding in height the length of the mean free path of an electron when said chamber has been evacuated, means within each of said recesses for making electrical connection to one of said spaced terminals within said chamber, means for providing external connections to said means for making electrical connection, while providing a tight seal thereabouts.

5. The combination, in a device for testing the seals of a plurality of crystal units having spaced terminals for electrical connection thereto, of a mounting plate arranged to support said units, a cover arranged to form, with said mounting plate, an air-tight chamber, seating apertures formed through said mounting plate, recessed shoulders about said apertures arranged to cooperate with said crystal units to limit the separation between said plate and said units to a maximum of less than the mean free path of electrons within said chamber, enlarged bores in registry with said apertures, resilient members disposed within said apertures and arranged to engage said spaced terminals, means extending externally of said chamber for providing connection to said resilient members, and cooperating means for maintaining an air-tight enclosure about said means for providing connection to said resilient members.

6. In a device for testing the effectiveness of the seals of a plurality of enclosed crystal units having spaced pin-type terminals projecting therefrom, the combination of a mounting plate for receiving such crystal units to be tested, a cover cooperating with said plate to form an airtight chamber, and permitting relatively free passage of air between the interior of those of said units having defective seals and said chamber, and means for preventing ionization curent flow between said terminals exteriorly of said crystal units.

7. In a device for testing the effectiveness of the seals of a plurality of enclosed crystal units having spaced pin-type terminals projecting therefrom, the combination of a mounting plate for receiving such crystal units to be tested, a cover cooperating with said plate to form an airtight chamber, means comprising recesses formed in said mounting plate for permitting entry of said terminals to a depth below the surface of said plate defining, between said plate, the adjacent surface of said unit, and said pin-type terminals, an air leakage space having its lesser dimension of the order of the mean free path of electrons at the pressure existing within said chamber, said surfaces defining said air leakage space between said terminals being formed of insulating material.

JOHN B. JOHNSON.

REFERENCES CITED

The following references are of record in the file of this patent:

UNITED STATES PATENTS

| Number | Name | Date |
| --- | --- | --- |
| 857,388 | Eno | June 18, 1907 |
| 1,377,282 | Schafer | May 10, 1921 |
| 1,697,339 | Baker | Jan. 1, 1929 |
| 1,789,557 | Machlett | Jan. 20, 1931 |
| 1,957,778 | Hopkins | May 8, 1934 |
| 1,983,669 | Kimble | Dec. 11, 1934 |
| 1,984,482 | Imamura et al. | Dec. 18, 1934 |
| 2,058,846 | Waterman | Oct. 27, 1936 |
| 2,088,218 | Schilling | July 27, 1937 |
| 2,169,605 | Griese | Aug. 15, 1939 |
| 2,340,837 | Meeker | Feb. 1, 1944 |